Patented July 22, 1941

2,250,041

UNITED STATES PATENT OFFICE 2,250,041

ZEIN COATING COMPOSITION AND METHOD OF PREPARING SAME

Oswald C. H. Sturken, Closter, N. J., assignor to Corn Products Refining Company, New York, N. Y., a corporation of New Jersey No Drawing. Application August 5, 1939
Serial No. 288,591

9 Claims. (Cl. 106—152)

This invention relates to the coating of porous or absorbent bodies, such as paper, cardboard and other fibrous fabrics and zein coatings.

The primary object of the invention is to provide a zein coating which will be permanently flexible.

It has been customary to incorporate into the zein solutions from which coating films are deposited, by evaporation of the solvent, certain substances known as plasticizers, the function of which is to increase the flexibility of the film. A number of these substances are known to have this function, for example, dibutyl tartrate, diethylene glycol and triethylene glycol. They are compatible with zein in solution with alcohol or other common zein solvents.

It has been observed, however, that when paper or other absorbent material is covered with a zein coating containing a plasticizer, the coating in time tends to become brittle.

It has been discovered, and the present invention is based upon such discovery, that the reason for the failure, or partial failure of the plasticizer to continuously perform its function of making the film flexible, is due to the fact that the tendency of the plasticizer to be absorbed, to a greater or less extent, by the porous body, paper for example, on which the coating is deposited so that it does not, at least fully, perform its plasticizing function.

The present invention has for its primary object to provide a suitable zein solution for coating porous or absorbent bodies.

Obviously this coating solution might be used for coating non-porous bodies; or for other like purposes.

Suitable zein solutions for carrying out the purposes of the present invention may consist of zein, anhydrous ethyl alcohol, a mutual solvent for the zein and anhydrous ethyl alcohol (zein being soluble in aqueous ethyl alcohol but not in anhydrous ethyl alcohol), such as toluol, and any one of the common zein plasticizers, such as dibutyl tartrate, diethylene glycol and triethylene glycol, these substances being compatible with zein in solution.

It is also preferable to use a resinous substance in order to give this film gloss and prevent tackiness. The preferred resinous substance is ester gum; but if odor and some colorization is not objectionable, it would be possible to use ordinary rosin or hydrogenated rosin. No claim is made herein to the use, broadly, of rosin, hydrogenated rosin, ester gum or other abietic acid containing substance, with anhydrous ethyl alcohol and zein in quantity sufficient to make the zein soluble in the alcohol, whereby the stability of the solution is increased, as that combination of substances is claimed in co-pending application of the applicant, Serial No. 288,589, filed August 5, 1939.

It is also desirable to use a plasticizer which is incompatible with zein, in which case it is necessary to dissolve the non-compatible plasticizer with toluol and alcohol before mixing it with the zein solution. The preferred non-compatible plasticizer is triacetin, which has the advantage of remaining more permanently in the coating. Dibutyl phthalate or tricresyl phosphate may be used in place of triacetin.

Possible solutions are exhibited in the following specific examples which, however, are to be considered as purely informative and typical and not as limiting the invention to the particulars given; the intention being to cover all equivalents and also all modifications within the scope of the appended claims.

EXAMPLE 1

The components are the following, the proportions by weight being, preferably, substantially as follows:

| | Parts |
|---|---|
| Zein | 100 |
| Ester gum | 50 |
| Dibutyl tartrate | 50 |
| Triacetin | 25 |
| Toluol | 100 |
| Anhydrous ethyl alcohol | 200 |

The zein may be commercial air dry zein but preferably is dried to a substantially anhydrous state.

The proportion of ester gum may vary from 50 to 100 parts and its place may be taken by rosin, or hydrogenated rosin, which are zein solvents.

The quantity of dibutyl tartrate, or other zein compatible plasticizer, may vary from 5 parts to 75 parts.

The proportion of triacetin may vary from 10 to 50 parts, and this substance may be replaced by like quantities of dibutyl phthalate or tricresyl phosphate.

The toluol may vary from 50 to 100 parts.

The anhydrous ethyl alcohol may vary from 100 to 300 parts. All of these figures are based upon 100 parts of zein.

EXAMPLE 2

The components are as follows, in proportion, by weight, as given below:

| | Parts |
|---|---|
| Zein | 100 |
| Diethylene glycol | 50 |
| Anhydrous ethyl alcohol | 200 |
| Toluol | 100 |

The solution of Example 2 is made by mixing together the four ingredients indicated. The solution of Example 1 is prepared in a somewhat different manner. The ester gum is dissolved in a larger portion of the ethyl alcohol, to which has been added about one-half of the toluol. The mixture is heated to 60° C. (140° F.); and there is then added the zein and the compatible plasticizer, dibutyl tartrate.

The triacetin or non-compatible plasticizer is dissolved separately in the remaining toluol and alcohol. This solution is then stirred into the rest of the mix. It is necessary to first dissolve the compatible plasticizer with the ester gum and toluol and then mix into this solution the dissolved incompatible plasticizer as otherwise the latter would not go into solution with the zein and compatible plasticizer.

EXAMPLE 3.—*The coating process*

The zein coating solution made in accordance with Example 1 or Example 2, or otherwise, is applied by means of a coating or roll to a sheet of paper, which has been previously coated with a nitro-cellulose or pyroxylin lacquer; and the applied zein coating is then partially dried for three minutes at 75°–85° C. (167° to 185° F.). Assuming that the article to be coated is a piece of porous or absorbent cardboard, this sheet is placed upon the still somewhat soft and sticky zein coating and the transfer to the cardboard made by subjecting the sheets to pressure and to heat of about 60° C. (140° F.). After this has been done, the transfer sheet may be stripped from the cardboard, leaving the zein coating firmly adherent to the cardboard.

No claim is made herein to the method described in Example 3 and elsewhere referred to in the specification, as this method is described and claimed in co-pending application of the applicant, Serial No. 338,914, filed June 5, 1940, as a continuation in part of the present application, following requirement for division in this case; the present case being limited to the coating solution by itself regardless of how used, together with the process of compounding the same.

I claim:

1. A coating solution containing zein, anhydrous ethyl alcohol, a mutual solvent for the alcohol and zein, a plasticizer compatible with the zein and a plasticizer non-compatible with the zein of the group of substances consisting of triacetin, dibutyl phthalate and tricresyl phosphate.

2. A coating solution containing zein, anhydrous ethyl alcohol, a mutual solvent for the alcohol and zein, a plasticizer compatible with the zein, a plasticizer non-compatible with the zein of the group of substances consisting of triacetin, dibutyl phthalate and tricresyl phosphate and a resinous substance which is a solvent of zein.

3. Process of compounding a zein solution suitable for coating purposes which comprises: dissolving zein and a zein compatible plasticizer in anhydrous ethyl alcohol and toluol; dissolving an incompatible plasticizer of the group of substances consisting of triacetin, dibutyl phthalate and tricresyl phosphate in toluol and anhydrous ethyl alcohol; and mixing together the two solutions.

4. A solution for coating and like purposes ocmprising: zein; an alcoholic solvent of zein; triacetin; and a solvent of triacetin which is compatible with the alcoholic solution of zein.

5. A solution for coating and like purposes comprising: zein, an alcoholic solvent of zein; triacetin; and toluol.

6. A solution for coating and like purposes comprising: zein; anhydrous ethyl alcohol; a mutual solvent for the zein and the anhydrous ethyl alcohol; triacetin; and a solvent of triacetin which is compatible with the alcoholic solution of the zein.

7. A solution for coating and like purposes comprising: zein; anhydrous ethyl alcohol; a mutual solvent for the zein and the anhydrous ethyl alcohol; triacetin; and toluol.

8. An alcoholic solution of zein containing triacetin in solution therewith.

9. A solution for coating and like purposes comprising: zein; anhydrous ethyl alcohol; ester gum; dibutyl tartrate; triacetin; and toluol.

OSWALD C. H. STURKEN.